United States Patent [19]

Tidd

[11] Patent Number: 4,563,747
[45] Date of Patent: Jan. 7, 1986

[54] PHOTOCOMPOSING APPARATUS AND METHOD

[75] Inventor: James A. Tidd, Laconia, N.H.

[73] Assignee: Bedford Computer Corporation, Bedford, N.H.

[21] Appl. No.: 446,040

[22] Filed: Dec. 1, 1982

[51] Int. Cl.$^4$ .................. B41B 13/00; G05B 15/02
[52] U.S. Cl. ........................ 364/523; 354/5; 354/7; 358/296
[58] Field of Search .............. 364/167, 523, 525; 354/4, 5, 7; 355/47, 67; 346/107 R; 358/78, 296, 302

[56] References Cited

U.S. PATENT DOCUMENTS

| | | | |
|---|---|---|---|
| 3,638,541 | 2/1972 | Lew et al. | 354/7 |
| 3,952,311 | 4/1976 | Lapeyre | 354/4 X |
| 4,000,495 | 12/1976 | Pirtle | 354/7 |
| 4,044,290 | 8/1977 | Gullo | 354/7 X |
| 4,096,486 | 6/1978 | Pfeifer et al. | 354/4 X |
| 4,270,172 | 5/1981 | Tidd et al. | 354/7 X |
| 4,342,504 | 8/1982 | Ebner | 354/5 X |
| 4,353,628 | 10/1982 | Berman | 354/5 |
| 4,378,149 | 3/1983 | Ebner | 354/5 |
| 4,427,275 | 1/1984 | Stalzer | 354/4 |
| 4,435,064 | 3/1984 | Tsukada et al. | 354/5 X |
| 4,447,126 | 5/1984 | Heidrich et al. | 354/5 X |
| 4,458,254 | 7/1984 | Gerber | 354/4 X |

Primary Examiner—Felix D. Gruber
Assistant Examiner—Kevin Teska
Attorney, Agent, or Firm—Frank A. Steinhilper

[57] ABSTRACT

Apparatus and methods for photocomposing as, for example, phototypesetting utilize photographic film on a moving member such as a rotatable cylinder with an array of multitudinous light emitting diodes movable along the length of the cylinder to project to the film an image of graphic information to be recorded on the film. The array moves to scan the film with overlap between one scan and the next to merge images of one scan into images of the next scan with a minimum of discontinuity. Overlapping exposures from individual LEDs further increase sharpness of image and substantially eliminate variations from non-uniformities of the individual LEDs.

10 Claims, 10 Drawing Figures

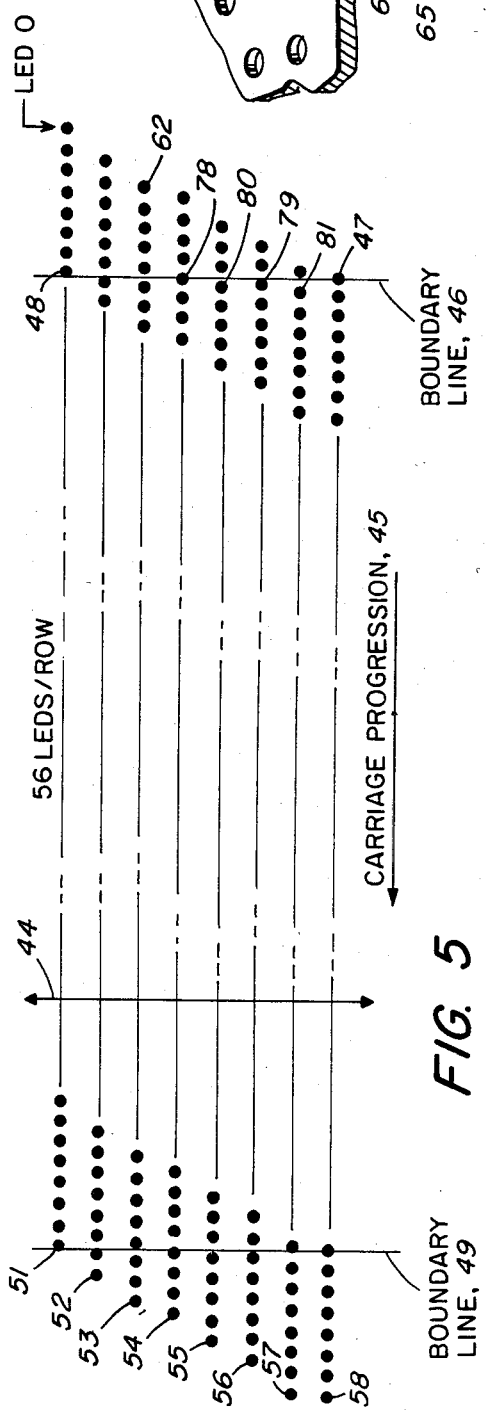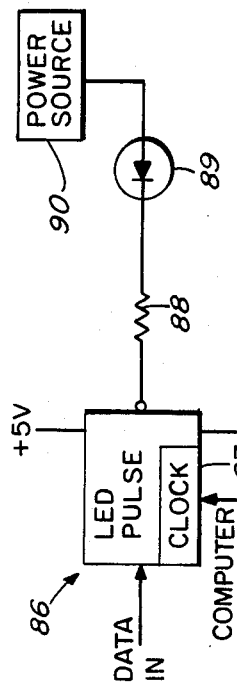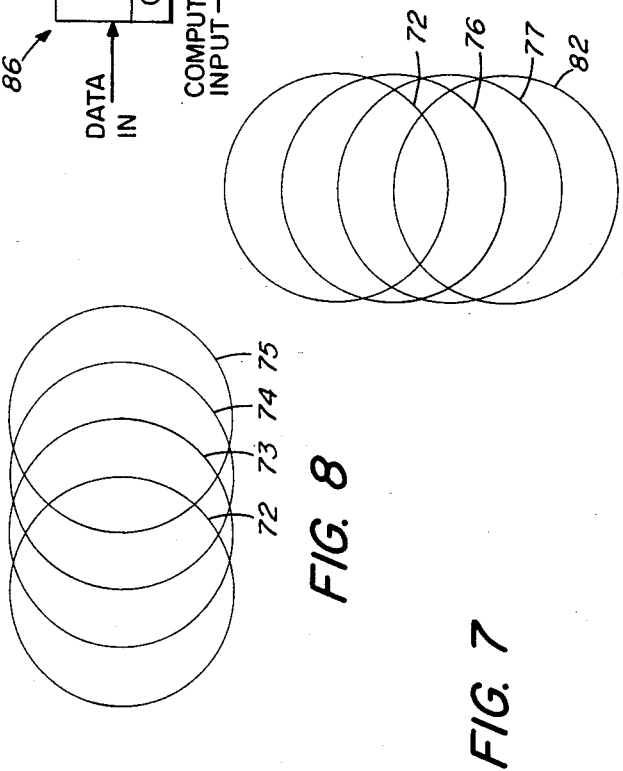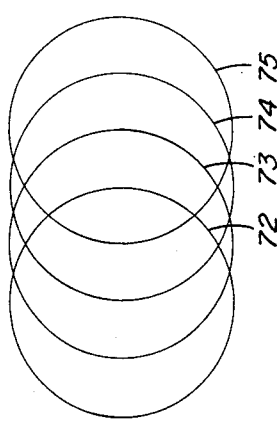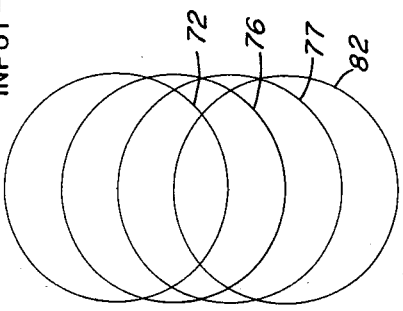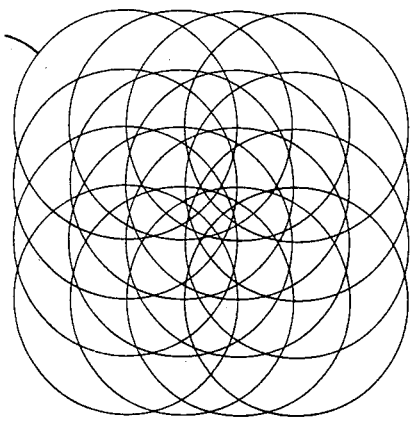

PHOTOCOMPOSING APPARATUS AND METHOD

BACKGROUND OF THE INVENTION

In photocomposing a graphic pattern is prepared on or composed on a photo-sensitive member such as a photographic film or the like. This record may be artistic, informational or may be utilized for a practical intended purpose. A common use and application is in phototypesetting where it is usual to prepare a photo record from a store of preformed alphanumeric characters on a rotatable film record and to rotate this record at high speed. The desired character is selected and its motion stopped with a timed flash of light and the image of the character is thus projected onto the photocomposition recording film. It was with systems such as this that phototypesetting reached widespread commercial use.

More recently other faster or more flexible means of character formation or pattern writing have been introduced. In one line of effort the laser became common as a light source, being a fast, high intensity light source. In another line of effort character formation and pattern writing replace the preformed alphanumeric type font. Tidd U.S. Pat. No. 4,270,172 is illustrative, showing a cathode ray tube as an image former to produce a light pattern representing the desired alphabet, numbers and graphic patterns to be set as a printing master.

The cathode ray tube system solves many problems in producing a printing master, but it, also, is in need of improvement. There are problems and limitations with such systems, particularly in making high quality, high resolution images, such as the difficulty of maintaining precise positioning of large images and large image segments on the face of the tube. Particularly where an image has continuing lines through a number of image segments through a number of scans, it is difficult to maintain the precise positioning throughout the length of a line or across the individual scan segments. In addition there is the well known tendency of cathode ray tube systems to drift, particularly with changes in temperature or upon aging of system components. The need, therefore is clear for a system to retain many of the advantages of the cathode ray tube system while avoiding its difficulties.

Some but not all of the problems are alleviated by a system such as that disclosed in Ebner U.S. Pat. No. 4,342,504 which uses a narrow printing head with several light emitting diodes (LEDs) whose output is carried to a photorecording element by a bundle of glass fibers. One trouble with systems using LEDs is that the LEDs are not uniform in light emitting quantity, with the result that the record also is not uniform in density. For example, at the present state of the art of manufacture of LEDs in large quantities it is common to have variations of at least as great as double or half the quantity of light emitted in response to a signal applied to one or another of such LEDs.

The present invention has solved these and other problems and employs light emitting devices such as light emitting diodes which may be of nonuniform quantity of emission, still achieving a uniform image on a photorecording element and avoiding many of the problems associated with prior art systems of photocomposing.

GENERAL NATURE OF THE INVENTION

Photocomposing apparatus such as, for example, phototypesetting apparatus is provided comprising a rotatable drum or other movable member having a record receiving element such as a photographic film mounted thereon, moving at a controlled, measured velocity in one direction. Associated with the drum are signalling elements such as a plurality of slits regularly spaced around the drum at one end thereof with a light positioned to pass through the slits to a sensor to receive and count the light passing through to signal the position of the drum as it rotates.

Positioned adjacent to the drum is an array of LEDs sufficient in number to produce a multiplicity of small pixels or small exposure areas to be projected onto a photorecording element mounted on the drum. In one embodiment of the invention the number of LEDs is related to the bit number 512, reserving some of the bits for overlap as disclosed hereinafter or for control operations or other selection factors in the phototypesetting system. Actually employed on one embodiment of the invention are eight rows of fifty-six LEDs in each row, with the individual rows each slightly displaced one with respect to another to result in a scan of a row of 448 LEDs.

An optical carriage positioned adjacent to the drum is movable along the length of the drum and carries the LED array. The carriage moves along the length of the drum as the drum rotates, preferably holding steady during the revolution and stepping one step along the drum at the end of a rotation. Each step is less than the carriage width, and accordingly each band of the scan overlaps with the band preceeding and the band following.

A programmed computer, programmed to the text being produced and adapted to receive signals of drum and carriage movement, controls the light emission of the selected LEDs in the array, causing them to emit selectively to product letters, numbers, drawings, pictures and other patterns of the composition.

In one embodiment of the invention, each LED separately emits an exposure pulse to combine with other pulses from the same or another LED in the array to provide a small character or dot or other small picture area. In each such character area is a combination of a multiplicity of exposure segments in a predetermined pattern, with a relatively larger number of individual exposure pulses in a central portion of the area producing a dense dark-image exposure area consequent upon exposure to a relatively large number of pulses, a number of which are from different LEDs, whereby differences in light emission quantity from one individual LED is eliminated as a factor in image quality. Each such character or small picture area is extremely small, being of a size close to the resolving power of the unaided human eye.

Gradated overlap is provided between the area or band scanned by the trailing edge of the LED array during one drum revolution and the leading edge of the array during the next revolution to smooth out any positional variation from one scan to another and to blend the scans together, providing excellent image quality for lines and patterns which continue through a plurality of scan areas. In combination with this overlap, LED pulses within the overlap areas are partially omitted in the first scan and incorporated into the successive overlapping scan. Line distortion, which is a familiar deficiency of certain scanning systems wherein a line or image in a plurality of scans, is substantially reduced.

The general nature of the invention having been described, the invention may be more fully understood in connection with the drawings, in which:

FIG. 5 is a plan view of a light emmiting diode array according to one embodiment of the invention;

FIG. 6 is a fragmentary view, partially in section, of a diode mask according to one embodiment of the invention;

FIG. 7 is a diagrammatic view of a character dot according to one embodiment of the invention;

FIG. 8 is a diagrammatic view of the character dot of FIG. 7, showing a horizontal dot composite;

FIG. 9 is a like view of the character dot of FIG. 7, showing a vertical dot composite;

FIG. 10 is a diagrammatic view of a pulse assembly for a light emitting diode according to one embodiment of the invention.

SPECIFIC DESCRIPTION OF THE INVENTION

Figure 1:
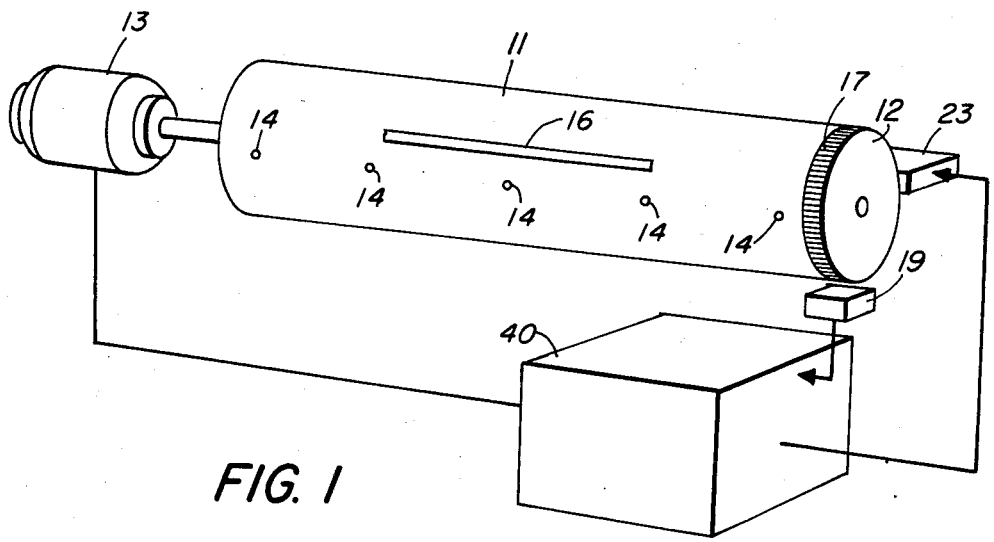
FIG. 1 is a diagrammatic perspective view of a phototypesetting assembly according to one embodiment of the invention.
Figure 2:
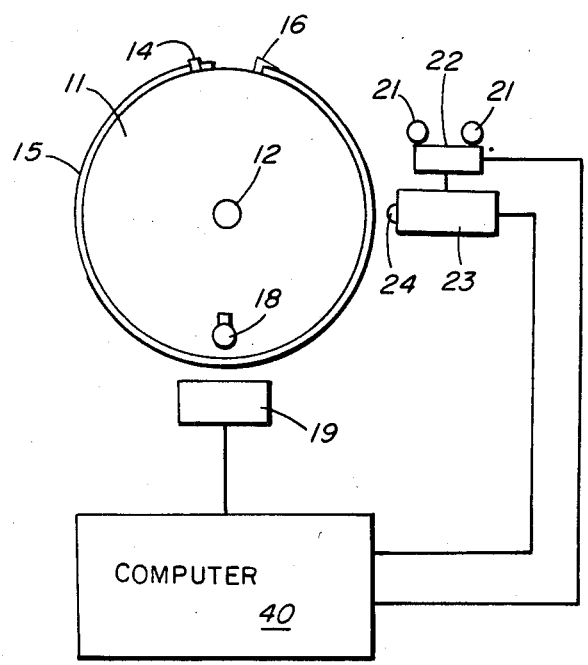
FIG. 2 is an end view of the apparatus in FIG. 1.

In FIGS. 1 and 2 is shown diagrammatically a phototypesetter according to one embodiment of the invention including a rotatable drum 11, rotated around an axle 12 and driven by motor 13. Mounted on drum 11 are a plurality of mounting pins 14 adapted to hold a film 15 or other photorecord member having a plurality of mating mounting holes. A lamp 18 within drum 11 is mounted to shine through slits 17 around the circumference of drum 11 near one end of the drum, and a sensor 19 is mounted outside the drum 11 positioned and adapted to sense pulses of light coming through slits 17 as drum 11 rotates. The drum may be rotatable in one direction only, or its rotation may be reversible.

At a desired location near drum 11 is a lead screw driven carriage 23 which carries an array 20 of light emitting diodes (LEDs) see FIG. 5. Carriage 23 is mounted on a pair of rails 21 extending along the length of drum 11, and drive motor 22 is adapted to drive carriage 23 along rails 21 and thus along drum 11. A lens 24 is mounted with array 20 on carriage 23 to focus an image of the LED array 20 at the drum surface and on a film 15 when such film is mounted on drum 11. In actual practice the lens is selected to provide a sharp reduction of the array 20 on the drum surface, and a reduction of 33⅓ to one has been found usefully consistent with the size of present day LEDs and the ability of the human eye to distinguish fine patterns.

A computer 40 is programmed with the text of printing to be set. The computer receives from sensor 19 signals indicating the rotational position of drum 11 and directs to LED array 20 the character information or other printing text to be recorded on film 15, also directing to the drum drive motor 13 signals to control drum rotation and directs to carriage drive motor 22 the signals for stepping carriage 23 along drum 11.

The apparatus shown is well adapted for composing the text for a text of a newspaper to produce a film such as lithographic film therefor. When so used, the lines of the text run around the circumference of drum 11 and the vertical dimension of the newspaper is the direction along which carriage 23 scans.

To operate the apparatus a film sheet 15 is placed on pins 14 and secured with clamp 16, and drum 11 is rotated. Drum 11 makes a revolution with the light emitting diodes flashing according to control signals from computer 40, then steps one width across drum 11. As drum 11 continues its rotation, the LESs are activated to record on film 15 a next sequence or band of graphic design onto film 15, After each revolution of drum 11 the carriage 23 steps another width and the subsequent band of print is recorded. If desired, the rotation of drum 11 may be stopped and reversed after each scan band, and such reversal is often desired when recording a small dimension text.

Figure 3:
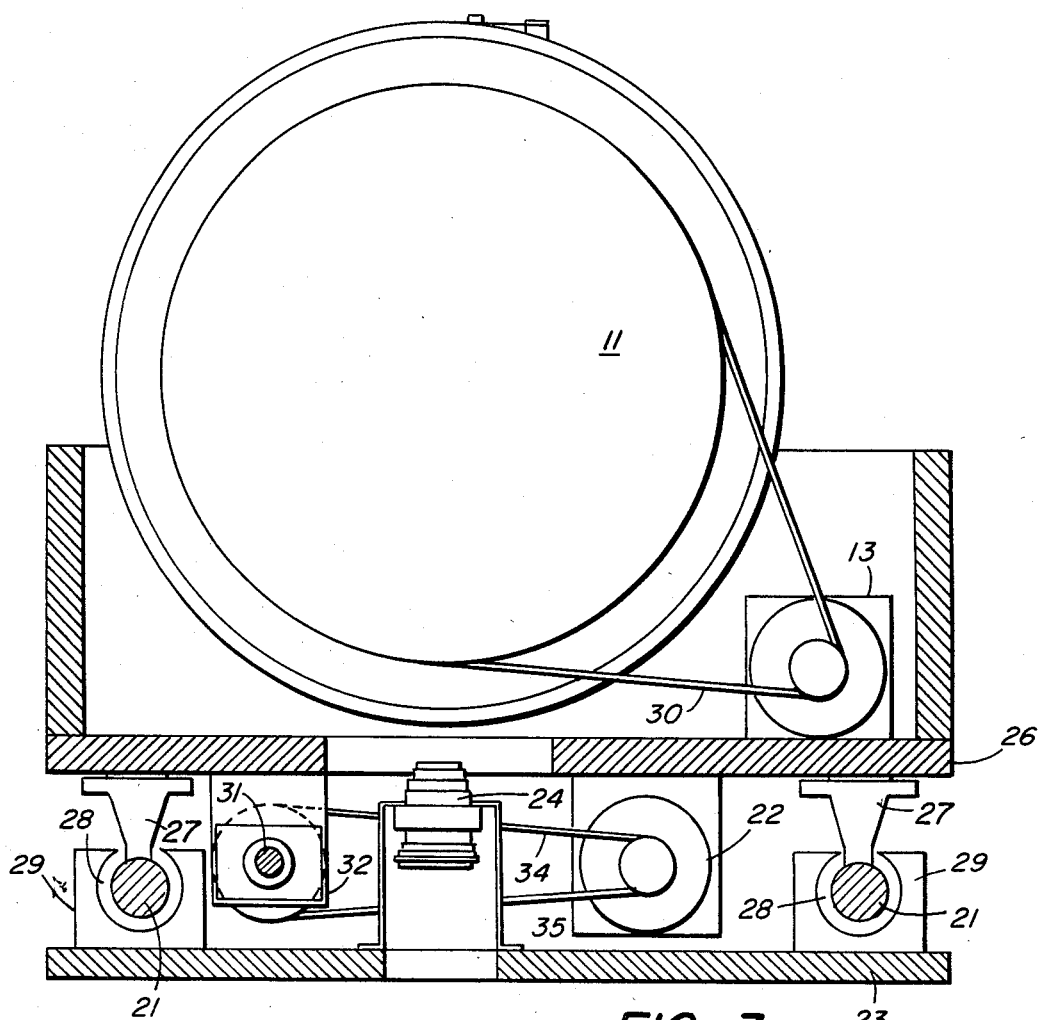
FIG. 3 is an end view of a carriage assembly according to the apparatus of FIG. 1.

FIG. 3 shows carriage 23 mounted to the main frame 26 of the photocomposing apparatus by means of rails 21 held to frame 26 by support holders 27 and slidably mounted on and movable along rails 21 by slide bearings 28 in bearing blocks 29. Drum drive motor 13 is bolted to frame 26 and has a toothed belt or timing drive belt 30 operably connected to drum 11. Also shown on carriage 23 is carriage screw 31 in block 32, along with carriage drive motor 22 which has a precision drive belt 34 to drive carriage 23 along rails 21. A lens 24 is mounted on carriage 23 by lens support 35 and is adapted to receive light from array 20 and to focus the light at the drum surface.

Figure 4:
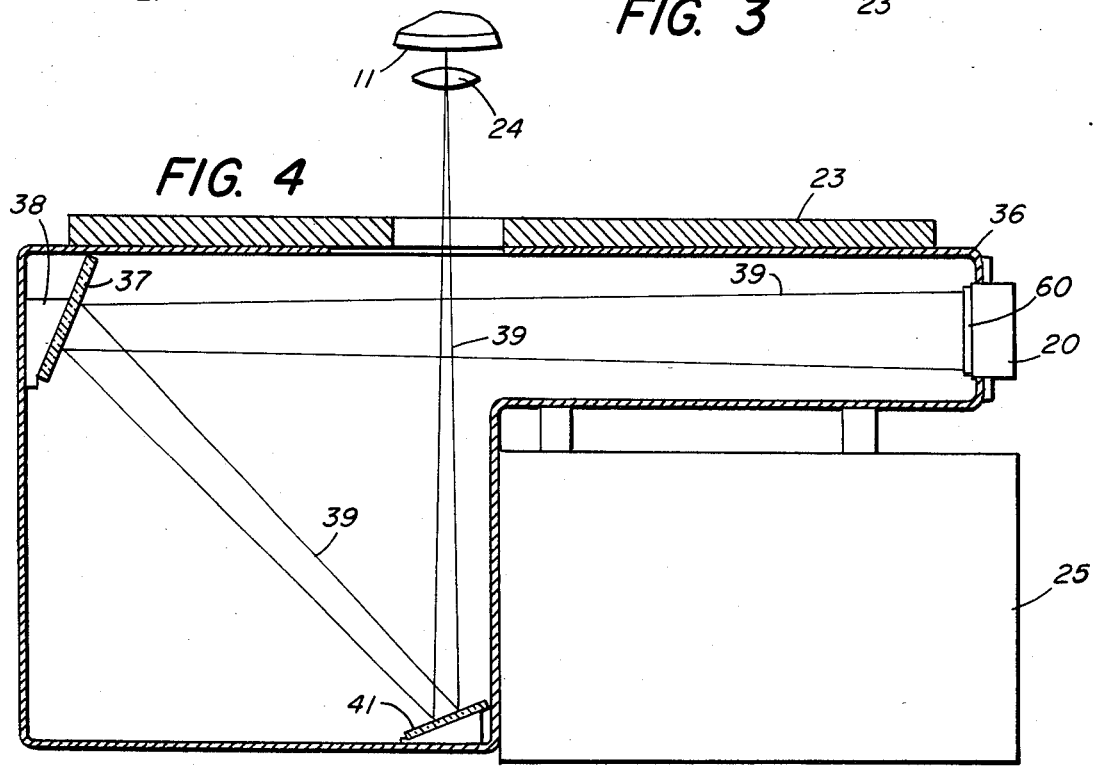
FIG. 4 is a diagrammatic top view of optical assembly of the apparatus in FIG. 3.

In FIG. 4 is carriage 23 having support elements 36 holding array 20 to carriage 23. A mask 60 having precisely positioned apertures 61 (see also FIG. 6) is positioned in front of array 20. A first mirror 37 is mounted to frame supports 38 at a distance from array 20 to receive a light image from the array as indicated by light lines 39. A second mirror 41 in turn receives light as a reflected image from first mirror 37 and directs it to lens 24. Also shown in FIG. 4 is the location of cabinet 25 for the driving electronics for array 20.

In FIG. 5 is shown the geometry of the LED array 20, comprising a plurality or rows or columns numbered 51 to 58, each row having fifty-six LEDs. Also indicated is the drum rotational direction as designated by line 44, and the direction of carriage progression as designated by arrow 45. It is particularly noted that rows 51 to 58 are positioned at different distances along the direction of carriage progression: thus row 52 is positioned to the left of row 51, row 53 is positioned further to the left and the successive rows positioned successively further to the left. Thus as drum 11 rotates it sees each row of LEDs in its own unique position. Furthermore, this gradated positioning is not uniform from one row to the next: as can be seen by locating the positions of individual LEDs with reference to a vertical line, the different LEDs are spaced so that when the drum rotates the LEDs in successive rows fill in spaces between LEDs in previous rows to produce a scanned band which is uniformly exposed throughout its area to a plurality of LEDs at all points in the scan area, as will be shown in further detail in FIGS. 7 to 9. The consequential result of this offset of rows is comparable to scanning exposure to a row of LEDs as numerous as the entire array: in this case where there are eight rows of fifty-six LEDs in each row, the result is comparable to exposure of 448 LEDs packed more tightly than their physical dimensions would have allowed.

Shown in FIG. 5 is a right hand boundary line 46, indicated by a vertical line passing through LED 47 at the right hand end of row 58. In top row 51 of the array, this boundary line 46 passes just inside LED 48, the eighth LED of the row so that eight LEDs are outside this boundary. Row by row the number of LEDs outside the boundary taper down until in row 58 the end LED is at the boundary. Similarly but in reverse, outside the left hand boundary line 49 there are eight LEDs in row 58, seven in row 57, decreasing to a single LED in row 51. As can be seen, cumulatively each row has an equal total number of LEDs outside the boundaries.

The consequence of this tapered geometry is readily seen in connection with the operation of the apparatus. When the apparatus of this invention is in operation for phototypesetting or for other photocomposing operations such as photoplotting, drum 11 is rotating and the LEDs are selectively emitting in response to signals from computer 40. Carriage 23 is stationary throughout the active portion of a drum revolution, and at the end of the active period it steps forward to the next scan position. This scanning or stepping distance is the distance between left boundary 49 and right boundary 46. Thus during the second revolution of drum 11, the right hand area of array 20, or the portion outside boundary 46, is retracing the path scanned by the corresponding left hand area during the previous revolution of drum 11. In this manner the cumulative exposure provided by the right hand edge in one scan and the left hand edge in the prior scan is smoothly integrated to equal the total exposure in the middle scan areas. Thus, if there is minor variation in image position between one scan and the next scan, this shift is merged in the overlapping scan portion and a line passing through several scan bands does not visibly change position with such passage through successive scans. It is apparent that this overlapping scan reduces image distortion that is well known in the various branches of the art of composing images photographically, including the art of phototypesetting, photocomposing, photoplotting and the like. The rows 51 to 58 of LEDs are not uniformly offset or graded equal distances. As can be seen in FIG. 5, row 52 is considerably further left of row 51 than is row 54 positioned left of row 53. This mixed degree of gradation produces a smoother blending of the edges of one scan into the edges of the preceeding and following scans.

In FIG. 6 is shown a portion of a mask 60 having rows of apertures 61 precisely positioned according to the desired position pattern for the LEDs. This mask 60 may be any suitable opaque mamber having transparent areas 61. A suitable mask 60 may be a black anodized aluminum sheet with holes at the precise aperture positions. The exact location of the pattern of light from the LEDs is fixed by the pattern of apertures 61 in mask 60 so that positioning of the LEDs themselves is such as to fit snugly at apertures or openings 61. Minute variations of the actual LED positioning are thus corrected or compensated. When a heat conductive mask such as anodized aluminum is employed, the LEDs are fitted into a heat-conductive contact with the mask. FIG. 6 shows one such LED fitted against the mask, as with LED 62 fitted against mask 60 at the aperture 61. LED 62 is shown with a pin electrode 64 having a connecting wire 65 leading to the computer 40 and having a second pin electrode 66 in turn connected to a suitable element for power or other electrical connection.

FIG. 7 shows diagrammatically a minute character area generally designated 70, divided into a multiplicity of overlapping exposure segments 71. As shown there are four overlapping rows of four columns each, or sixteen exposure segments mutually overlapping in the character area 70. The size, spacing and geometric arrangement of the projected image of array 20 are selected to provide signals compatible with the capabilities of the human eye. Accordingly a minute character area or dot was selected at a size such that when a straight line is displaced by such unit of dimension the unaided human eye does not detect such unit of displacement. In the particular presentation of FIG. 7 the area shown is about 0.003 square inches, this being consistent with the capabilities of the human eye. For end purposes where the ultimate dot is to be examined by optical aids for the human eye a finer measure of the character area of FIG. 7 may be utilized, with a finer spacing of LEDs and apertures.

FIG. 8 illustrates one row of exposure segments such as the segments 71 of FIG. 7. As shown there are four such segments shown in FIG. 8 as segments 72, 73, 74, and 75 in a horizontal row. Each exposure segment represents a single exposure of record member to a flash of light from one of the LEDs in array 20. As illustrated in FIG. 8 there was an exposure of the area of segment 72, as for example by exposure to LED 78 of FIG. 5. With relative motion by displacement of film 15 either before or after the exposure of segment 72, by movement of carriage 23, by lens movement or by other movement a LED is in position for exposure to segment 73. For example, drum rotation may bring LED 79 of FIG. 5 into position for exposure to segment 73. In addition there are other exposures each with relative movements, for example to expose film 15 to LED 80 at segment 74 and then LED 81 at segment 75. The order of the exposures is here described in relation to position and not necessarily in relation to time.

The result of these successive exposures is overlapping exposure segments 72, 73, 74, and 75, with a portion of segment 72 being exposed to only one LED or to only one pulse from a LED, a next portion including segment 72 being twice exposed, a third portion in which part is thirce exposed, and a central portion including part of segment 75 being four times exposed. Following are portions decreasingly exposed to three, two, and then one LED.

FIG. 9 shows a vertical column of exposure segments 72, 76, 77 and 82. These overlapping segments, like those of FIG. 8, are exposed to overlapping emissions. These of FIG. 8 are in a direction across the rows of LEDs of FIG. 5 or in the direction of drum rotation, and may be made by successive pulsing or activation of a single LED or by a longer pulse of a single LED as the drum motion imparts the movement between the segments 72. 76. 77 and 82. For example, LED 78 as it moves with respect to film 15 may cause such overlapping segments of exposure.

Referring again to FIG. 7, it is seen that the vertical segments of FIG. 9 and the horizontal segments of FIG. 8 are cumulatively combined in the character area or dot 70. There are relatively fewer exposures or pulses at the corners and along the edges of the character area 70 and many more cumulative exposures closer to the center. In the embodiment illustrated there may be the equivalent of about twelve pulse exposures in some central areas.

In connection with the cumulative exposures illustrated in FIG. 7, in the preferred operation of the invention the exposure levels and the film sensitivity and contrast are balanced so that an exposure less than about three levels (according to FIG. 7) produces a film density sufficiently low as to appear little more than background fog and thus not to appear as part of the character or pixel of the image. Upon greater exposure, such as exposure of about five or more levels according to FIG. 7, the density increases to about 1.5 and becomes relatively dark. Continuing exposures can produce densities in the range of about 2.0 or higher, reaching densities above 3.0 if desired. A sharp pixel outline is therefore seen relatively near the outline of the character area illustrated in FIG. 7. For producing a lithographic master there results a clear sharp print.

In FIG. 10 is shown a power pulse system for a light emitting diode such as used in the invention. A LED pulse unit 86 comprises one or several conventional electronic chips such as are capable of sinking the LED drive current. Computer control signals operate a clock 87 on the pulse unit, and graphic data signals are fed to the unit. Output from unit 86 feeds through resistance 87 to the LED 89. A power source 90 supplies power such as +5 volts. Using, for example, Hewlett Packard LEDs 5082–4160, a typical output of about 3 millicandelas can be realized with pulses in the order of about $10^{-5}$ seconds. Satisfactory image quality and contrast is obtained with films intended for lithographic master making such as, for example Kodak SO553 or Kodak Kind 2497 film. If greater contrast is desired, other higher contrast films are commercially available.

I claim:

1. Apparatus for photocomposing comprising
   a rotatable cylinder having means to hold a photorecord member on the surface of said cylinder,
   drive means adapted to rotate said cylinder,
   sensing means to sense rotation of said cylinder and to generate signals corresponding to such rotation,
   computer means,
   means to convey to said computer means said signals corresponding to cylinder rotation,
   a slidable optical carriage mounted to move along the length of said cylinder, an array having a multiplicity of individually excitable solid-state light emitting devices, each having a control electrode exciting said light emitting devices in response to an input signal, said array arranged in rows across the direction of cylinder rotation and in columns displaced from one another with respect to said direction of cylinder rotation, the displacement being of an order of distance such that a plurality of light emitting devices are brought to bear and overlap on each individual pixel on said photorecord member as said cylinder moves through a single revolution,
   optical means mounted on said carriage to focus on said cylinder surface a projected image of light as emitted by said light emitting devices,
   means to drive said carriage along said cylinder whereby said image of light is moved along said cylinder surface and,
   means connecting said electrodes individually to said computer means,
   said computer means being adapted to determine the rotational position of said cylinder and the position of said carriage along said cylinder and to direct to each of said light emitting devices signals coordinated with said rotational position and corresponding to a desired pattern to be recorded on a photorecord member positioned on said cylinder.

2. The apparatus of claim 1, wherein said solid-state light emitting devices are light emitting diodes.

3. The apparatus of claim 1, wherein the means to drive said carriage along said cylinder comprises stepping means and wherein each of the steps is a small fraction of the dimension of said array in the direction of stepping.

4. The apparatus of claim 1, wherein said solid-state light emitting devices are light emitting diodes and wherein said means to drive said carriage along said cylinder comprises stepping means, each step being a small fraction of the dimension of said array.

5. In photocomposing,
   a method of forming a pixel of a size sufficient to be detected by the unaided human eye on a photorecording member, comprising
   as a first step, exposing a first segment of a pixel to a projected image of an activated light emitting device in a first location within a pixel area,
   as a second step, exposing a second segment of a pixel to a projected image of an activated light emitting device in a second location within said pixel overlapping with said first segment,
   and repeating said first and second steps a multiplicity of times within said pixel area for a multiplicity of partially ovelapping segments within said pixel.

6. In a photocomposing system wherein an array of light emitting devices is repeatedly scanned across a pattern area, the steps comprising
   providing an array of light emitting devices having substantially uniform light emitting capability in a central area of said array and decreased light emitting capability along the edges thereof,
   scanning said array in a first band on an area of a pattern in a direction to form a band having band edges of progressively reduced exposure density,
   stepping said array to a second, adjacent and partially overlapping band area, and scanning said array in a second band parallel with said first band wherein the decreased band edges overlap one with another,
   and repeating said scanning and stepping a multiplicity of times to form a pattern area comprising a multiplicity of overlapping bands,
   whereby the light emitting quantities in adjacent overlapping edges cumulatively reinforce each other to provide substantially equal light emitting quantities of the central band areas to form substantially uniform exposure capability throughout the pattern area.

7. In photorecording apparatus,
   an array of solid-state light emitting devices arranged in a predetermined pattern of a plurality of rows, each row having a multiplicity of light emitting devices,
   scanning means to move said array along a light image area,
   the individual rows being displaced longitudinally with respect to one another such that a plurality of light emitting devices track in overlapping configuration on said light image area when said array is scanned on an image-receiving surface in a direction across said rows,
   a mask having a multiplicity of apertures therein, said apertures being arranged in a plurality of rows and having a multiplicity of apertures in each row corresponding in location to said predetermined pattern, said mask being fitted over said array to permit said light emitting devices to be visible through said apertures, lens means adapted to focus light from said mask in greatly reduced size onto a photorecording member, computer means adapted to signal a predetermined pattern of a light image to be recorded, individual electrodes on each light emitting device adapted to receive signals from said computer means to excite said light emitting device individually in response to an input signal from said computer means, and individual connecting means connecting each of said electrodes to said computer means, whereby said computer means is adapted to excite said individual light emitting devices to emit light in a pattern corresponding to said predetermined light image.

8. Apparatus according to claim 7 wherein said array of light emitting devices is adapted for scanning in a direction substantially at right angles to said rows, said array having rows progressively offset, each row being offset from the row which preceeds it in the scanning direction, to provide at each end of said array edge areas having progressively decreased quantity of light emitting devices within said edge areas, whereby said edge areas are areas are overlapped during successive scans to cumulatively provide substantially uniform quantity of light emitting potential as a consequence of such overlap, and within said array the light emitting devices of adjacent rows being displaced from one another in distances such that light emitting devices in adjacent rows are further offset from one another in the direction along said rows than are light emitting devices in rows which are more distant from one another.

9. In a photocomposing apparatus having a rotatable drum adapted to carry a photosensitive surface thereon and having a carriage movable along the length of the drum and means to move said carriage along said drum to scan said carriage along said drum surface as said drum rotates and said carriage moves, an array of solid state light emitting diodes mounted on said carriage, and optical means mounted on said carriage to focus on said cylinder a projected image of said light emitting devices, said array being arranged in a plurality of rows along the direction of the length of said drum, the rows being displaced relative to one another along the lengthwise direction such that the light emitting diodes in various rows are longitudinally displaced relative to one another and such that the projected images of said light emitting diodes travel in displaced and overlapping paths on said drum surface during drum rotation, the sum of the density of light emitting diodes being essentially constant through the predominant length of said rows and, the sum of the density at each end of said array being tapered, whereby successive scans of said array along said drum may provide overlap of said tapered ends along said drum surface.

10. In photocomposing wherein a photosensitive member is exposed to a pattern of individual minute areas of light to form a pattern of exposure corresponding to an image to be reproduced, the method comprising establishing a source of individual light units adjacent to a photosensitive member and projecting and focusing light from said source onto said photosensitive member and building exposure to light in a multiplicity of individual areas on said photosensitive member by successively projecting light from a plurality of individual light units to each of said individual areas, whereby a pattern of exposure is built up on said photosensitive member, each portion of said pattern being in response to a plurality of individual exposures.

* * * * *